US006791900B2

(12) United States Patent
Gillard et al.

(10) Patent No.: US 6,791,900 B2
(45) Date of Patent: Sep. 14, 2004

(54) METHOD OF CALCULATING A THROW VOLUME FOR QUANTITATIVE FAULT ANALYSIS

(75) Inventors: Dominique G. Gillard, Houston, TX (US); John E. Eastwood, Bellaire, TX (US); Brian P. West, Houston, TX (US); Theodore G. Apotria, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/430,173

(22) Filed: May 6, 2003

(65) Prior Publication Data

US 2003/0231548 A1 Dec. 18, 2003

Related U.S. Application Data

(60) Provisional application No. 60/388,565, filed on Jun. 13, 2002.

(51) Int. Cl.[7] ............................. G01V 1/36; G06F 19/00
(52) U.S. Cl. ............................. 367/40; 367/42; 367/51; 367/73; 702/16; 702/17
(58) Field of Search ............................. 367/40, 42, 51, 367/73; 702/16, 17

(56) References Cited

U.S. PATENT DOCUMENTS

| 5,260,968 A | * | 11/1993 | Gardner et al. ............. 375/347 |
| 5,671,344 A | * | 9/1997 | Stark ......................... 345/419 |
| RE38,229 E | * | 8/2003 | Marfurt et al. ............... 702/16 |
| 6,708,118 B2 | * | 3/2004 | Stark ......................... 702/16 |

| 2003/0023383 A1 | * | 1/2003 | Stark ........................... 702/14 |
| 2003/0200092 A1 | * | 10/2003 | Gao et al. .................. 704/258 |

FOREIGN PATENT DOCUMENTS

| WO | 03/003051 | * | 1/2003 |
| WO | 03/003054 | * | 1/2003 |

OTHER PUBLICATIONS

Marfurt, K. J. and Kirlin, R. L. (2000) "3–D Broad–Band Estimates of Reflector Dip and Amplitude", Geophysics, vol. 65, No. 1, (Jan.–Feb. 2000), pp. 304–320.
Marfurt, K. J. et al. (1999) "Coherency Calculations in the Presence of Structural Dip", Geophysics, vol. 64, No. 1, (Jan.–Feb 1999), pp. 104–111.
Pathak, R. et al. (1999) "Role of Dip & Azimuth Attributes in Delineation of Subtle Faults: A Case Study", Society of Exploration Geophysicists, Exp. Abstr., 1999 Technical Program, vol. 1, SEG 69th Annual Meeting, Houston, TX Oct. 31–Nov. 5, 1999, pp. 965–968.

* cited by examiner

Primary Examiner—Nelson Moskowitz
(74) Attorney, Agent, or Firm—J. Paul Plummer

(57) ABSTRACT

A method of calculating a throw volume corresponding to a seismic data volume. A range of time shifts and a search direction for the seismic data volume are selected. A data location separation and a vertical time window are also selected. A cross-correlation is calculated between data values corresponding to first and second data locations separated by the data location separation and symmetrically located in the search direction on each side of a target data location. The cross-correlation is calculated throughout the vertical time window for each time shift in the range of time shifts. The time shift corresponding to the maximum calculated cross-correlation is stored in the throw volume.

5 Claims, 4 Drawing Sheets

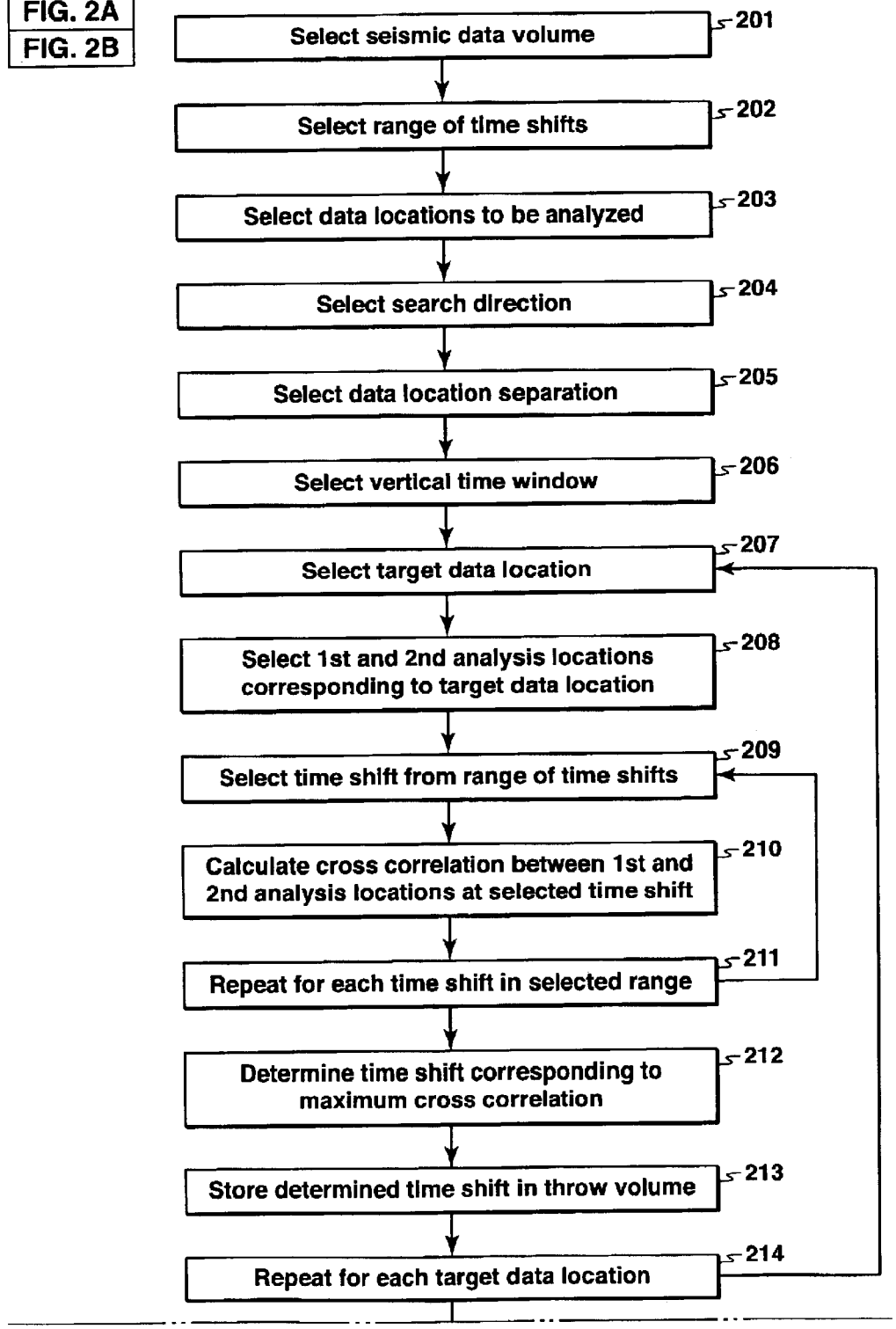

METHOD OF CALCULATING A THROW VOLUME FOR QUANTITATIVE FAULT ANALYSIS

This application claims the benefit of U.S. Provisional Application No. 60/388,565 filed on Jun. 13, 2002.

FIELD OF THE INVENTION

This invention relates generally to the field of seismic data processing. Specifically, the invention is a method of calculating a throw volume for quantitative fault analysis.

DESCRIPTION OF THE RELATED ART

Fault interpretation plays an important role in the understanding of the segmentation of hydrocarbon reservoirs. Evaluating the risk for fault seals in reservoirs requires knowledge of three parameters: strike, dip and throw along the fault. At present, these parameters are generally extracted from 2D depth structure maps generated from fault and horizon interpretations.

Faults may be detected by looking at vertical offsets of seismic reflectors in a volume of seismic data. As will be understood to those skilled in the art, the continuity of seismic reflectors in a volume of seismic amplitude data may be quantified by computing the correlation coefficient between adjacent seismic traces over a movable vertical window. A low coefficient of correlation indicates that the reflector is discontinuous at the location of those traces. The three dimensional representation of calculated correlation coefficients which results thereby provides an analytical, and in graphical form a visual, representation of the amount of discontinuity in the reflectors in the seismic data volume. Such a volume is called a discontinuity volume. However, discontinuity analysis does not provide information on the amount of throw across faults, and does not provide a mechanism for determining dip direction when scrolling through time slices of a volume of seismic data.

Several techniques have been used in the oil industry to generate time lag volumes, also called dip volumes, for use in steering coherency calculations along dipping reflectors. Many of these techniques are based on cross correlation analyses that compute the time lag, which is also referred to as the time dip, necessary to flatten the reflectors. However, because time lag associated with reflector flattening may be independent of the time lag associated with fault throw, these techniques are not tuned to obtain the correct lag associated with a fault. Furthermore, it is not necessarily desirable to align or flatten reflectors across faults if the goal of an analysis is to image discontinuities. In addition, for best results in dip-steering discontinuity imaging, the time lag obtained from cross-correlation calculations should be measured at a regional scale and not just locally, as is the case with many of the time lag volume-related techniques.

More specifically, prior art techniques using cross-correlation-based analyses for discontinuity disclose methods that begin with an estimate that first applies a pre-defined dip azimuth measurement axis to remove a significant portion of the regional structural dip. Next a semblance calculation is performed, as a function of time to multiple seismic traces, to further estimate and correct for local dip. During this step a maximum semblance cube may be created that highlights stratigraphic and structural discontinuities, corrected for structural dips. Such techniques have as a principal objective the production of cross-correlation, semblance, or coherence measures of reflector terminations, such as faults or channel edges. A by-product of the computations is a time-dip or lag volume which describes a smooth, apparent, dip of reflectors but at the same time, and directly as a result of the effect of smoothing, contains no information about throw across faults.

Another technique applied in the art examines the similarity of multiple traces at various time lags to estimate the dip of reflectors. An eigenstructure algorithm is then used to calculate the similarity of traces in the locally averaged dip direction. In this technique, the best discontinuity images, in other words those most useful for interpretation purposes, are generated by smoothing locally estimated dip measurements to obtain the regional dip and using the smoothed regional dip to steer the coherency calculation. The technique allows the attenuated effect of the local dip measurement across faults to result in better images of fault discontinuity. Although a dip cube is a by-product of the computation, throw information is not obtained because of the smoothing that is applied.

Although information may be gained in fault throw measurements from structural maps generated from manual fault and horizon interpretation, cost issues and trade-offs in cycle-time, potential subjectivity, and density of observations arise.

None of the above-described techniques make use of the lag volume for imaging faults or obtaining throw information along faults. Thus there exists a need for a method to generate fault orientations and fault throws throughout a volume of seismic amplitude data for quantitative evaluation of fault parameters that can be used to facilitate fault interpretation and also to evaluate fault seal potential.

SUMMARY OF THE INVENTION

The invention is a method for analysing faults in a three-dimensional volume of seismic data by calculating a throw volume. A range of time shifts and a search direction for the seismic data volume are selected. A data location separation and a vertical time window are also selected. A cross-correlation is calculated between data values corresponding to first and second data locations separated by the data location separation and symmetrically located in the search direction on each side of a target data location. The cross-correlation is calculated throughout the vertical time window for each time shift in the range of time shifts. The time shift corresponding to the maximum calculated cross-correlation is stored in the throw volume.

BRIEF DESCRIPTION OF THE DRAWINGS

The present invention and its advantages may be more easily understood by reference to the following detailed description and the attached drawings in which.

Figure 1:
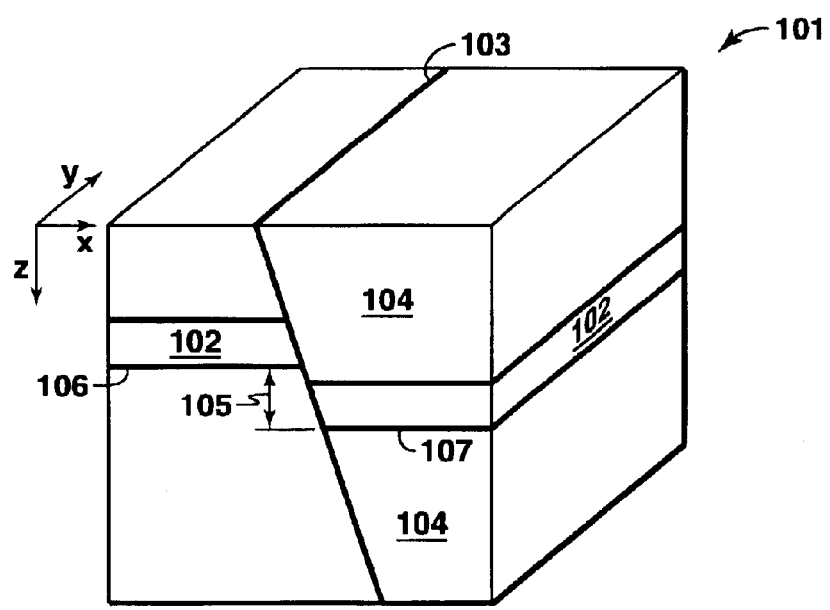
FIG. 1 is a schematic view of a seismic volume with one horizontal layer cut by a fault.

While the invention will be described in connection with its preferred embodiments, it will be understood that the invention is not limited thereto. On the contrary, it is intended to cover all alternatives, modifications and equivalents that may be included within the scope of the invention, as defined by the appended claims.

DETAILED DESCRIPTION OF THE INVENTION

The present invention takes a volume of seismic amplitude data as input and generates a new type of derivative volume, called a throw or time lag volume, as output. The method of the present invention allows generation of fault orientations and fault throws throughout a volume of seismic data for quantitative evaluation of fault parameters. The throw volume and those parameters facilitate the visualization, characterization, and automation of the mapping of faults in seismic data as well as the quick evaluation of the risk for fault seal potential. Most specifically, the method of the present invention for determining fault throw within a volume of seismic data without use of pre-existing horizon assumptions or fault interpretations improves the efficiency and accuracy of fault interpretation as well as helps to rapidly evaluate fault seal potential based on reflector juxtaposition.

The throw volume resulting from the present method displays the time lag necessary to align or flatten reflectors throughout and in any azimuthal direction of the volume corresponding to the seismic data. The throw volume provides numerous positive benefits to seismic data analysts. Most importantly, when using the throw volume where reflectors are offset by a fault, the time lag measured at a point on the fault in the direction perpendicular to the fault becomes the actual throw across the fault at this point and is independent of any horizon interpretation. The throw values can then be extracted from the cube and mapped directly onto a fault surface. In addition, fault tips, often characterised by small inflections on a reflector, are better imaged using the throw volume than by prior art methods.

Another advantage of the present method is that the throw volume contains quantitative information about fault parameters that can be used in fault seal analysis as well as in fault interpretation in general. The method of the invention offers an efficient and precise way to measure the throw over the entire fault surface. This represents an improvement over traditional fault throw analysis techniques, which are generally based on determining the vertical displacement along the fault between two interpreted horizons using 2D structural maps. Furthermore, faults dipping in opposite directions can be distinguished on time slices, which helps interpreters map faults more rapidly and more accurately by allowing them to distinguish fault segments belonging to different faults. Thus, the method of the invention improves the ability of interpreters to quantify fault parameters such as strike, dip, and throw while interpreting a volume of seismic data.

The throw volume may also be used to generate dip-steering discontinuity volumes in conjunction with volume-based seismic facies analysis. In this application, as will be understood to those skilled in the art, the time lag across the faults is meaningless and the parameters are chosen to reflect best the regional time dip of the reflectors. This is a result of the preference in such applications of ensuring that the volume appropriately reflects the general trend on each side of the fault.

In the method of the invention, the time lag is computed in only one direction—perpendicular to the fault being imaged. To measure the lag corresponding to the throw across the fault, the cross-correlation is computed as a function of lag between two traces. The two traces are either adjacent or separated by a specified number of traces. The separation depends on the dip of the fault being imaged. The size of the vertical window over which the lag is calculated is a function of the frequency of the seismic data. By using two non-adjacent traces, the regional lag along the reflector and a best estimate of the lag across the fault can be obtained without having to smooth the lag calculation. The lag volume or throw volume is therefore an improvement over the prior art because of the preservation of throw values across faults.

The method of the present invention can be illustrated by reference to FIG. 1, which illustrates the concept of fault throw. FIG. 1 shows a schematic view of a seismic volume 101 with a horizontal layer 102 cut by a fault 103. In this example, hanging wall 104 moves down. Fault throw 105 is the vertical component of the displacement across fault 103. In a seismic data volume where the vertical z-axis is two way travel time, throw 105 is the vertical time lag measure between two reflectors 106 and 107, respectively, offset by fault 103. Throw 105 is called "apparent throw" if the measurement is done in a vertical plane that is not perpendicular to the fault surface.

Figure 2B:
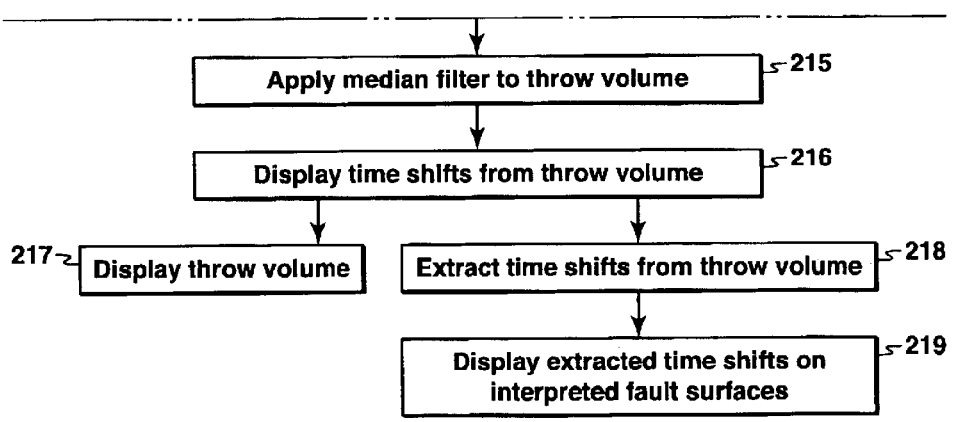
FIG. 2 is a flowchart (shown in two parts, 2A and 2B) illustrating the processing steps of an embodiment of the method of the invention for calculating throws in a seismic data volume.

FIG. 2 is a flow chart (comprising parts 2A and 2B) illustrating the processing steps in an embodiment of the method of the present invention. First, in step 201, a three-dimensional volume of seismic data samples is selected for fault analysis. This volume corresponds, for example, to volume 101 in FIG. 1. The seismic data may involve, but not be limited to, time- or depth-migrated seismic data, such as near, far, or full stack seismic amplitude or attribute data.

The seismic data volume will be used to generate a three-dimensional throw volume. The data locations in the throw volume will correspond to the data locations in the seismic data volume. However, the data values in the throw volume will be time shifts that characterise the time lag necessary to align or flatten the reflector at the data location, and, where reflectors are offset by a fault, to quantify the throw across the fault.

The method of the present invention may be applied to seismic data volumes that have not been depth-converted. In such cases the throw volume is a time domain representation of the vertical time shift or lag that quantifies the throw across a fault. Use of the present method on depth-converted seismic data volumes would result in a spatial measure of the throw, in other words the vertical displacement across the fault. Reference in the following to time and/or time shifts is for convenience, and is not intended to be limiting.

In step 202, a range of time shifts is selected. The range of time shifts, also called time lags or throws, is preferably selected to cover the maximum potential throw expected on the faults of interest within the seismic data volume. The maximum potential throw may be estimated if not known directly from other data sources. A maximum and minimum time shift may optionally be selected to define the range of time shifts desired, or simply the maximum time shift may be specified.

In step 203, the data locations that are to be analyzed are selected. In a preferred embodiment, the data locations will comprise every data location in the seismic data volume. However, any appropriate subset of data locations in the seismic volume that sufficiently characterizes the regions in the seismic data volume containing the faults of interest may be used.

In step 204, a search direction is selected. The search direction will be the direction in which a cross-correlation to detect faults and quantify fault throw will be calculated. Thus, the search direction is preferably selected to be in the primary direction of interest for analyzing faults in the seismic data volume, and therefore is preferably selected to be a direction substantially perpendicular to the strike of the faults being analyzed. The search direction may also be specified to be an orientation of interest, such as a channel thawing, or orthogonal to a dominant faulting orientation. Note that, as will be understood to those skilled in the art, if a search direction is specified which is not perpendicular to the faults of interest, the calculated throw is called the "apparent throw".

For ease of computation, the search direction is preferably selected to be either the inline or cross-line direction of the seismic survey used to collect the seismic data in the seismic data volume from step 201. The inline and cross-line directions can, in such case, be identified with the horizontal x and y directions of a Cartesian co-ordinate system describing the data locations in the seismic data volume. These data locations will also be the data locations in the throw volume resulting from the method of the invention. The cross-correlation calculations to be discussed below will then involve data locations in a preferred minimum spacing, thus facilitating calculation of a throw volume with the highest resolution possible for the underlying seismic data. In an alternative embodiment, the search direction may be selected to be either the horizontal x direction or y direction of any Cartesian co-ordinate system in which the data locations of the seismic data volume are described, and which may differ from the in-line and cross-line directions of the seismic survey.

In step 205, a data location separation magnitude is selected. The data location separation determines the amount of distance to move on each side of the target data location for the cross-correlation calculation. Since seismic data is typically recorded as substantially regularly spaced seismic traces, the target data locations will be at seismic trace locations. Thus, the data location separation will usually be expressed in terms of the number of traces separating the analysis locations, as further defined in relation to step 208 below. Trace skipping allows for smoother time shift measurements along reflectors and is preferred in order to ensure that the dip of the fault does not negatively influence the throw calculation. The minimum data location separation magnitude that can be selected is one trace, which is the case when the analysis locations involve consecutive traces.

In step 206, a vertical time window is selected. The vertical window size is preferably selected to be at least twice the size of the maximum time shift selected in step 202. However, the vertical window size will be selected on a case-by-case basis depending on the properties of the fault that is the focus of the analysis. Considerations include the amount of throw expected in the fault, whether the fault is expected to be listric, and whether the fault surfaces may have evidence of erosion in geologic time. These considerations will be understood to those skilled in the art. Note that if the present invention is applied to depth-converted seismic data the vertical window will be in units of vertical displacement, in other words in meters for example.

The selections of vertical window size, step 206, the range of time shifts, step 202, and the data location separation, step 205, will be a function of the anticipated dip of the faults and the amount of vertical time shift across the fault that needs to be resolved. In general, as steeper dips are encountered or larger look distances are required, window size and time shift should increase. Such considerations will be understood to those skilled in the art.

In step 207, a target data location is selected from the data locations selected in step 203.

Next, in step 208, a first analysis location and a second analysis location are selected symmetrically and on opposite sides of the target data location selected in step 207. The first and second analysis locations are selected so that they are along the search direction selected in step 204, separated by the data location separation selected in step 205, and within the vertical time window selected in step 206. As will be understood to those skilled in the art, analysis locations represent points on the traces that comprise the seismic data for which the throw volume is being calculated.

Figure 3:
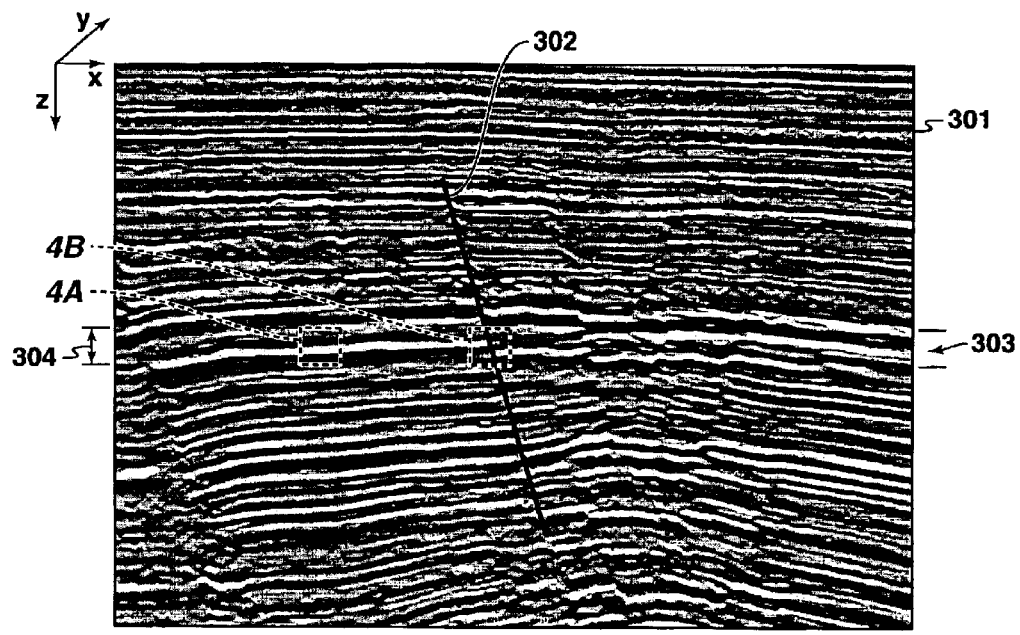
FIG. 3. is a hypothetical seismic section corresponding to a vertical slice of a seismic volume.

Steps 201 through 208 are further explained by reference to FIG. 3 and FIG. 4. FIG. 3 depicts seismic data that may correspond, for example, to the schematic of FIG. 1. More specifically, FIG. 3 depicts a seismic section 301 corresponding to a vertical slice of seismic volume 101 of FIG. 1 for the co-ordinate y=0 and for the entire range of x and z co-ordinates. In FIG. 3, the data locations to be analyzed, as specified in step 203, comprise all locations within the seismic section 301. In this example, the search direction from step 204 will be along the x-axis. A fault 302 is depicted in section 301.

In FIG. 3, a horizontal window 303 is indicated from which the initial set of target data locations will be selected. In this example, window 303 represents a row of seismic data near the middle of the section. The vertical dimension 304 of window 303 is the same as the vertical time window specified in step 206.

Figure 4A:
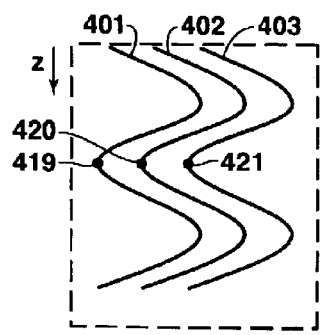
FIG. 4A depicts a vertical window excerpt of the seismic section of FIG. 3 in which the vertical offset between traces on either side of a target data location is zero.
Figure 4B:
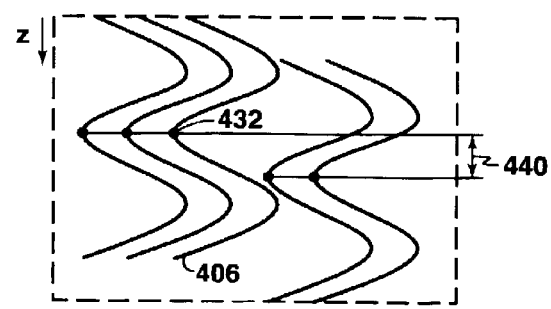
FIG. 4B depicts a vertical window excerpt of the seismic section of FIG. 3 in which the vertical offset between traces on either side of a target data location is nonzero.

FIG. 4A and FIG. 4B depict two expanded sections of window 303, and the locations of these sections within the window are designated on FIG. 3 as 4A and 4B. Location 4B is selected to straddle fault 302. As will be understood in the art, the seismic data within window 303 of FIG. 3 comprises segments of sinusoidally varying time series. Examples of such time series segments are depicted in FIGS. 4A and 4B. In FIG. 4A, a first target data location 420 has been specified, as have first and second analysis locations 419 and 421. In this example, first and second analysis locations are separated by one skipped trace, in other words correspond to a data location separation magnitude of one, where the trace separating the analysis locations is the trace at the target data location.

In step 209 of FIG. 2, a time shift is selected from the range of time shifts selected in step 202. In step 210, a cross-correlation is calculated between the first and second analysis locations selected in step 208 for the time shift selected in step 209. The cross-correlations are preferably calculated using a coherency or semblance calculation, as is well known in the art of seismic processing. However, the method of the invention is not restricted to these particular types of cross-correlations and any other three-dimensional objective function-based algorithm can be used. These cross-correlation calculations are preferably performed with 'on-the-fly' sub-sample interpolation.

In step 211, steps 209 and 210 are repeated for each time shift in the range selected in step 202. The method of the invention computes the cross-correlation coefficient between the two selected analysis locations within the specified vertical time window and for the range of time shifts. The time shift corresponding to the maximum correlation coefficient is measured with sub-sample accuracy by interpolating the correlation function over the range of time shifts and is stored for subsequent specification of the output throw volume. The vertical window is moved vertically along the seismic traces sample by sample and the procedure described above is repeated over the entire volume. Preferably, the cross correlation is computed by shifting consistently throughout the seismic data volume. In other words, correlating the trace on one side of the target data location relative to the trace on the other side of the target data location insures that normal faults dipping in opposite direction will have throws of opposite signs. In a preferred embodiment, cross correlations are calculated for all time shifts in the range of time shifts, and the maximum coefficient determined from those calculations. In an alternative embodiment, a subset of time shifts within that range may used to calculate cross correlations.

In step 212, the time shift corresponding to the maximum cross-correlation calculated in step 210 for the range of time shifts selected in step 202 is determined. In step 213, the time shift determined in step 212 is stored in a three-dimensional throw volume at a data location corresponding to the target data location selected in step 207.

In FIG. 4A, analysis locations 419 and 421 are depicted as being located at approximately the same vertical (z) co-ordinate, and thus the maximum cross correlation will occur at a zero time shift. This is indicated by the relative similarity, in other words lack of vertical offset, of the two traces 401 and 403 which are on either side of trace 402. This lack of vertical offset, as will be understood to those skilled in the art, is indicative of flat reflectors not influenced by a fault. In contrast, FIG. 4B depicts traces that are vertically shifted as a result of fault 302 in FIG. 3. In FIG. 4B, the maximum cross correlation for a target data location 432 on trace 406 will occur at the particular time shift in the discrete group of time shifts selected at step 202 that is closest in magnitude to the time shift 440 shown in FIG. 4B. This time shift is a measure of the throw at that z value.

In step 214, steps 207 through 213 are repeated for additional target data locations until all data locations selected in step 203 have been analyzed. It is preferred for ease of computation, although not required for the method of the invention, to select the target data locations in a systematic fashion. For example, in an application involving horizontal rows in a vertical cross-section, such as is depicted in FIG. 3, a preferred embodiment would involve the sequential selection of all data locations in the horizontal row as target data locations, and cross correlations would be calculated for each such target data location. In an alternative embodiment, a subset of data locations in each row could be specified as target data locations, where any such subset is sufficient to provide a desired level of coverage of the regions within the horizontal row containing the faults of interest.

In an application involving horizontal rows in a vertical cross-section, a preferred embodiment would involve performing cross correlation calculations for all horizontal rows in the vertical cross section. In an alternative embodiment, a subset of horizontal rows sufficient to provide desired coverage of the regions within the vertical cross section containing the faults of interest could be selected. Similarly, in a preferred embodiment, all vertical cross-sections in the seismic data volume are selected. In an alternative embodiment, a subset of vertical cross sections sufficient to provide desired coverage of the regions within the seismic data volume containing the faults of interest could be selected.

In step 215 (refer now to the flow chart continuation in FIG. 2B), a median filter may optionally be applied to remove noise in the resulting throw volume. A 3×3 median filter is preferably used. Persons skilled in the art will understand the considerations involved in selecting the median filter for use in this step of the present invention. Alternatively, the median filter could be set to a size appropriate to the scale of the fault structures of interest. Whether user-defined constraints are specified or not, spurious alignments, due to factors such as noise in the seismic data, can result from the use of single trace-moving cross-correlation algorithms, such as is involved in the method of the present invention. Therefore, interactive median filtering in three dimensions may improve the spatial and temporal consistency of the throw volume, minimising the effects of any such noise.

Steps 216 through 219 involve the specification of the manner in which the calculated information is to be displayed. If the throw volume is to be displayed as a three dimensional volume of the calculated time shifts, then the present inventive method ends at step 217. In this option the display of the throw volume preferably uses a color scale that clearly separates positive and negative time lag in order to be able to distinguish between faults dipping in opposite directions. Alternatively, the fault throw values can be extracted from the throw volume, step 218, and mapped onto interpreted fault surfaces, step 219.

Mapping the throw distribution onto the fault offers an important benefit to fault seal analysis because throw variations along faults control the juxtaposition of sand and shale layers on each side of the fault. In traditional fault seal analysis, throw is derived from 2-D structure maps where both faults and horizons need to be interpreted prior to extracting the throw information. This is a time consuming process, biased by interpreter subjectivity, which only generates sparse throw values along the part of the fault intersected by the interpreted horizon. Using the throw volume, one can extract the throw information over the entire surface of the fault, and is more accurate and not subjective because horizon interpretation is not involved.

As another example of a use of the present invention, co-rendering (superimposing) of the throw volume together with the corresponding discontinuity volume can facilitate the interpretation of faults, fault tips, and other structural and stratigraphic features from seismic or seismic attribute data. Further, the throw volume can be used in quantifying the kinematics and geometry of complex fault systems, particularly where associated deformation is diffuse over a broad volume of rock. In such situations the throw volume may also be used to more accurately condition geologic models and reservoir simulations for various geologic parameters, potentially including permeability.

It should be understood that the preceding is merely a detailed description of specific embodiments of this invention and that numerous changes, modifications, and alternatives to the disclosed embodiments can be made in accordance with the disclosure herein without departing from the scope of the invention. The preceding description, therefore, is not meant to limit the scope of the invention. Rather the scope of the invention is to be determined only by the appended claims and their equivalents.

We claim:

1. A method of calculating a throw volume for a seismic data volume, comprising:

(a) selecting a range of time shifts, a search direction, a data location separation, and a vertical time window for the seismic data volume;

(b) calculating a cross-correlation between data values in the seismic data volume which correspond to first and second data locations separated by the data location separation and symmetrically located in the search direction on each side of a target data location;

(c) repeating step (b) throughout the vertical time window for each time shift in the range of time shifts;

(d) storing the time shift corresponding to the maximum cross-correlation calculated in steps (b) and (c) in the throw volume; and (e) repeating steps (b), (c) and (d) for a plurality of target data locations in the seismic data volume.

2. The method of claim 1, wherein the seismic data is seismic amplitude data.

3. The method of claim 1, further comprising applying a median filter to the throw volume to attenuate noise.

4. The method of claim 1, further comprising extracting data values from the throw volume and mapping the extracted data values onto corresponding data locations on interpreted fault surfaces.

5. A method of calculating a throw volume for a seismic data volume, comprising:

(a) selecting a seismic data volume;

(b) selecting a plurality of time shifts for the seismic data volume;

(c) selecting a plurality of data locations from the seismic data volume;

(d) selecting a search direction for the seismic data volume;

(e) selecting a data location separation for the seismic data volume;

(f) selecting a vertical time window for the seismic data volume;

(g) selecting a target data location in the selected plurality of data locations;

(h) selecting first and second data locations symmetrically located on each side of the target data location in the search direction, separated by the data location separation and within the vertical time window;

(i) selecting a time shift from the selected plurality of time shifts;

(j) calculating a cross-correlation between the data values corresponding to the selected first and second data locations at the selected time shift;

(k) repeating steps (i) and (j) for each time shift in the selected plurality of time shifts;

(l) determining the time shift corresponding to the maximum cross-correlation calculated in step (k);

(m) storing the time shift corresponding to the maximum calculated cross-correlation at the corresponding target data location in a throw volume;

(n) repeating steps (g) through (m) for each data location in the selected plurality of data locations.

* * * * *